United States Patent [19]

Littlehale

[11] Patent Number: 4,542,762

[45] Date of Patent: Sep. 24, 1985

[54] AUTOMATIC LIQUID DELIVERY APPARATUS

[76] Inventor: Bradner M. Littlehale, 751 Fairmount Ave., Chatham, N.J. 07928

[21] Appl. No.: 425,094

[22] Filed: May 18, 1982

Related U.S. Application Data

[63] Continuation-in-part of Ser. No. 15,775, Feb. 28, 1979, Pat. No. 4,321,937.

[30] Foreign Application Priority Data

Dec. 31, 1981 [WO] PCT Int'l Appl. .................. PCT/US81/01775

[51] Int. Cl.⁴ .............................................. A01G 25/00
[52] U.S. Cl. .................... 137/78.3; 137/136; 47/48.5; 47/79; 239/63
[58] Field of Search ..................... 239/63, 64; 47/48.5, 47/79, 80; 137/78.2, 78.3, 132, 136

[56] References Cited

U.S. PATENT DOCUMENTS

| | | | |
|---|---|---|---|
| 753,174 | 2/1904 | Smith | 137/136 |
| 3,438,575 | 4/1969 | Rohling | 47/79 |
| 3,758,987 | 9/1973 | Crone, Jr. | 137/78.3 |
| 4,321,937 | 3/1982 | Littlehale | 47/48.5 |

*Primary Examiner*—A. Michael Chambers
*Attorney, Agent, or Firm*—Barnes & Thornburg

[57] ABSTRACT

An automatic liquid delivery apparatus which employs no moving parts and requires no external source of energy except gravity to operate, dispenses liquid from a constantly available source, which is open to the atmosphere, to a receiver or zone requiring liquid in response to a detector which is located in the zone and initiates discharge of the liquid. The apparatus includes a valve device which retains liquid against discharge from a container or supply by air pressure confined in a space in a passage. The valve device delivers liquid through the passage when air in the space is released by a control device. The control device is a detecting mechanism or other automatic operating element. The detecting mechanism can sense the moisture level in soil, in liquid, in roots growing in moist air, in plant tissues or any other location where moisture differentials can be detected.

12 Claims, 5 Drawing Figures

AUTOMATIC LIQUID DELIVERY APPARATUS

This application is a continuation-in-part of parent application U.S. Ser. No. 015,775, filed Feb. 28, 1979, now U.S. Pat. No. 4,321,937, issued Mar. 30, 1982.

Irrigation controlled by timers has long been used, but is often wasteful and difficult to control precisely, when exact moisture levels are desired. U.S. Pat. No. 3,758,987 shows a method of irrigation using an airtight liquid container which releases liquid when air is admitted to the container through a porous sensor in the soil. This has the disadvantage of requiring periodic refilling and also can be activated, when moisture is not required, by changes in temperature or barometric pressure.

One object of the subject invention is to eliminate the need for any moving parts such as a diaphragm or other mechanical shut-off means, in order that the device may be economically mass-produced. Diaphragm valves, controlled by the simplest of actuators, have been widely used for irrigation and operate on the principle that a small, water-filled porous container can create a variable vacuum up to nearly one atmosphere, inversely proportional to the moisture content of the soil it is immersed in, and can be connected to a diaphragm to operate a valve or electrical contacts.

A variation of the above method, contained in U.S. Pat. No. 3,981,446, utilizes part of the liquid being supplied for irrigation to generate air pressure or vacuum which operates a diaphragm valve that shuts off flow whenever air is unable to pass through a porous sensor in the soil because the soil contains adequate moisture to fill the pores in the sensor. Air must flow through the sensor continuously while irrigation is in progress and, only after air flow is stopped, the energy of the irrigating liquid under the pull of gravity is used mechanically to stop liquid flow.

All the embodiments of the liquid-delivery apparatus described in this or parent application U.S. Ser. No. 015,775, now U.S. Pat. No. 4,321,937, issued Mar. 30, 1982, operate on the same principle whereby a valve device uses the pressure of air entrapped in a passage between an upper liquid supply container and counterbalancing liquid retained lower in the passage to prevent outflow of liquid from the container until air is released by a control device which detects the need for moisture in a zone of liquid use. The released air is replaced by liquid which initiates outflow by rising in a column of increasing weight and pressure which acts to oppose and overcome the pressure of the entrapped air and counterbalancing liquid which had been preventing outflow of liquid from the container. Liquid then flows out until the container is empty, after which it refills from a liquid source through a restricted conduit or other flow-limiting means. Restricting inflow ensures that, once outflow has started, the container empties faster than it refills, allowing air to become entrapped in the passage after each flow cycle to prevent further outflow from the container until the control device again releases air.

In the subject invention, no moving parts are required and liquid flow is automatically prevented in a closed system, and is only initiated by the build-up of a flow-triggering column of liquid in response to the release of air, which is released entirely prior to, but not during, the irrigating period. This invention makes possible the delivery of precise and even minute quantities of liquid, where required, since the build-up of the liquid column ceases instantly when air outflow is stopped and no further liquid outflow can occur.

The detecting or control element located in the zone of liquid use and connected to the valve device by an air conduit is closed in the presence of the desired amount of moisture to prevent air escaping from the passage, or open when moisture is depleted to release air from the passage to initiate action of the valve. This element may, for example, be of porous ceramic, having fine orifices to close the conduit to egress of air when moisture is present. The degree of moisture required to close the conduit will be determined by the size of orifices selected. It may also have a single, larger orifice which will close only when a substantial amount of liquid closes the opening. Other types of elements which will prevent the passage of air in the presence of liquid in any form may also be used to control the egress of air from the conduit, so that when less that the desired amount of moisture is present, the passage will be opened to the atmosphere.

The counterbalancing liquid retained lower in the passage to entrap air and prevent outflow from the container may be retained in several ways. It may be retained in a "U"-shaped trap or may surround a vertical tube to provide counterbalancing pressure when air forces liquid downward in that tube. Liquid may also be held in a tube by capillary attraction so that a force in addition to gravity, such as air pressure, is required to expel it. Any arrangement whereby liquid is retained to resist air pressure may be considered as being included under the terms "entrapped liquid" or "counterbalancing liquid", and any means retaining such liquid may be referred to as a "liquid trap". Even a bubble formed at the outlet of a tube serves to retain air pressure.

There are several different ways in which a column of liquid which replaces air to trigger outflow may act upon the counterbalancing liquid. In all embodiments, counterbalancing liquid entraps air to prevent outflow of liquid from the container. The differences are mainly in the method of triggering liquid outflow. The simplest embodiment utilizes a single portion of counterbalancing liquid to entrap air which prevents outflow from the container and at the same time counterbalances the flow-triggering column of liquid, which rises as air escapes through the detector, until flow is triggered. In one such embodiment, contained in parent application U.S. Ser. No. 015,775, now U.S. Pat. No. 4,321,937, issued Mar. 30, 1982, and in another, illustrated by FIG. 5 herein, the flow-triggering column of liquid simply adds its pressure to that already exerted by the liquid in the container until the counterbalancing liquid is overpowered and forced into flow. The counterbalancing liquid may be retained in any type of liquid trap. Another embodiment, shown in parent application U.S. Ser. No. 015,775, now U.S. Pat. No. 4,321,937, issued Mar. 30, 1982, and a related embodiment, illustrated in FIGS. 1, 2, 3, and 4 herein, utilize an additional, secondary portion of counterbalancing liquid, which is not expelled by moderate fluctuations in supply level, but is expelled by a rise in the flow-triggering column of liquid when air escapes through the detector. When the secondary portion of liquid is expelled, it triggers outflow from the container.

The automatic liquid delivery apparatus of the present invention will maintain a constant amount of moisture or free liquid automatically, as in a liquid feeding system for plants, and no attention is necessary as long as liquid is available.

In liquid-feeding systems for plants according to the present invention, each valve device is controlled by a detector so placed that it will sense the lack of moisture needed by the plant and will initiate actuation of the valve device to feed liquid to the plant until the detector is contacted by sufficient moisture to cut off feeding of the liquid. This detector is tailored to suit the moisture requirements of the plant to allow only slight moisture or to add liquid until it rises to the required level. Thus, dry soil plants and plants grown hydroponically are furnished the proper amount of liquid, the detector for each plant or group of plants being selected according to the degree of moisture required.

In an automatic liquid-delivery apparatus according to the present invention, a quantity of liquid is held against discharge from a container by air pressure in a passage so that the liquid is discharged into the passage upon release of air. A detector located in a liquid receiver, as in a growing medium for plants, is closed by liquid to maintain the air pressure in the passage. When the liquid is depleted and the detector senses the lack of moisture, air will pass through the detector from the passage and, after air is released, the liquid will be discharged to flow from the container through the passage to the growing medium. The container is refilled, and this action is repeated until sufficient moisture or liquid is fed to the growing medium to close the detector to the egress of air, thereby confining air in the passage. The liquid in the container of the valve device is then retained until the liquid in the growing medium is depleted and the detector again senses the lack of sufficient liquid or moisture.

Each valve device can be connected to a single detecting element to irrigate a single plant or group of plants, or to a plurality of detectors connected in series so one valve device will irrigate all plants when any require moisture.

The automatic liquid delivery apparatus of the present invention can also activate an auxiliary liquid supply in a container for dispensing a larger quantity of liquid in one operation. In this supplemental supply system, a siphon is activated by liquid outflow from the valve to dispense liquid from the supplemental supply to the intended liquid use. One auxiliary container may serve many delivery valves. In this way, free liquid may be furnished in optimum quantities intermittently for hydroponic growth and plant roots receive the necessary oxygen because each quantity of the free liquid delivered must be absorbed and the roots aerated before detectors in contact with the roots allow delivery of the next quantity of liquid.

In one form of the invention, the automatic liquid-delivery apparatus is constructed of plastic film in which the passages and chambers are embossed and sealed. In another form, the apparatus is tubular in shape and constructed of molded plastic. Both forms can be produced to completion on automatic machinery at high speed and low cost. Other forms or materials may also be used. The apparatus can also be fabricated in a unit combining a plant container and liquid reservoir. In this case, or when the apparatus is placed in the growth medium, the detector may be attached directly to the valve, and separate conduits for outflow of air and liquid are not needed. Remotely placed valves may deliver liquid to plants via conduits.

The operation of the valve device controlling discharge of liquid from the container or other liquid supply is basic to the apparatus and feeding system. This valve device is illustrated as structurally associated with a liquid container, as one form of construction for use in the plant-feeding system. The principle of this liquid control may be utilized for liquid control in other systems, the valve device being capable of controlling flow from other forms of container or supply.

An automatic liquid-delivery apparatus of this invention depends on air pressure in a small air space to control liquid flow, and is independent of the volume of liquid controlled and of surrounding atmospheric pressure and temperature. The detector only releases air pressure from the space when liquid is needed, assuring proper operation under all conditions, while the emission of air through the detector will prevent clogging of the detector element or attached air line and malfunction of the apparatus.

While useful especially for growing plants, the invention may find many other applications where either a liquid level or a moisture content must be maintained, as in humidifiers, cooking pots, various processes and other operations. For other purposes, the detector may be designed to sense other conditions, resulting in the dispensing of liquid when the condition causes the detector to open to emit air from the apparatus. Further, the control of the discharge of liquid by release of air pressure may be applicable for other purposes where liquid flow is to be controlled by other types of automatic control means, or by manual operation, and other gaseous substances may be used in place of air.

The invention also makes it possible to grow plants and crops by the advanced method of feeding liquid nutrient directly to plant roots without need for soil or other solid growth medium. This system avoids the problem of uncertain rainfall, weeds, soil-borne diseases and predators, as well as toxic fertilizer residues. Nutrients and systemic insecticides can be added to the irrigating water more economically under this system in many cases. Since the plants themselves determine when irrigation is needed and gravity supplies the operating power, pumps or timers and electricity are not needed, and crops can be grown economically even on a small scale wherever adequate light, temperature, and water are available. Mechanical cultivation is not needed so terrain with poor or rocky soil, steep slopes, or even roof tops can be economically utilized. On sloping ground, plastic film can be used to collect and conduct rain water to storage for future irrigation, and the irrigating supply tubes and the liquid-delivery valves themselves can be heat-sealed to the plastic film, while containers for roots can be formed in the film to grow weed-free plants, isolated from contamination with the ground beneath, with detectors in contact with their roots. A system which uses only the amount of moisture required by the plants themselves is of great value in areas of the world where water is scarce and thereby has the potential to become an important weapon in the war against hunger.

Plants in houses, greenhouses, or gardens can be fed automatically, whether growing in soil or in lightweight containers which serve both as support and to prevent evaporation from the moist roots inside. Very small tubes can adequately conduct irrigating liquid from home water piping to locations at which plants are to be fed, where extremely small float valves maintain liquid continuously available to the liquid-delivery apparatus. One float valve can maintain a constant liquid level for a large area of plants. Homes could easily have outlets for irrigation just as they do for electricity, so plants could be cared for indefinitely without attention. Groups of plants can also be grown in vertical or sloping orientation with their roots, one above the other, having detectors in contact with the root masses, connected in series to one valve of the present invention which will deliver liquid by gravity from root to root until all roots are moist.

Various other features and advantages of the present invention will become apparent to those skilled in the art upon consideration of the accompanying drawings which illustrate the invention and show a preferred embodiment exemplifying the best mode of carrying out the invention as presently perceived.

FIG. 5 shows a side cross-sectional view of an alternative exemplary embodiment with liquid levels in static equilibrium before liquid delivery is called for.

Figure 1:
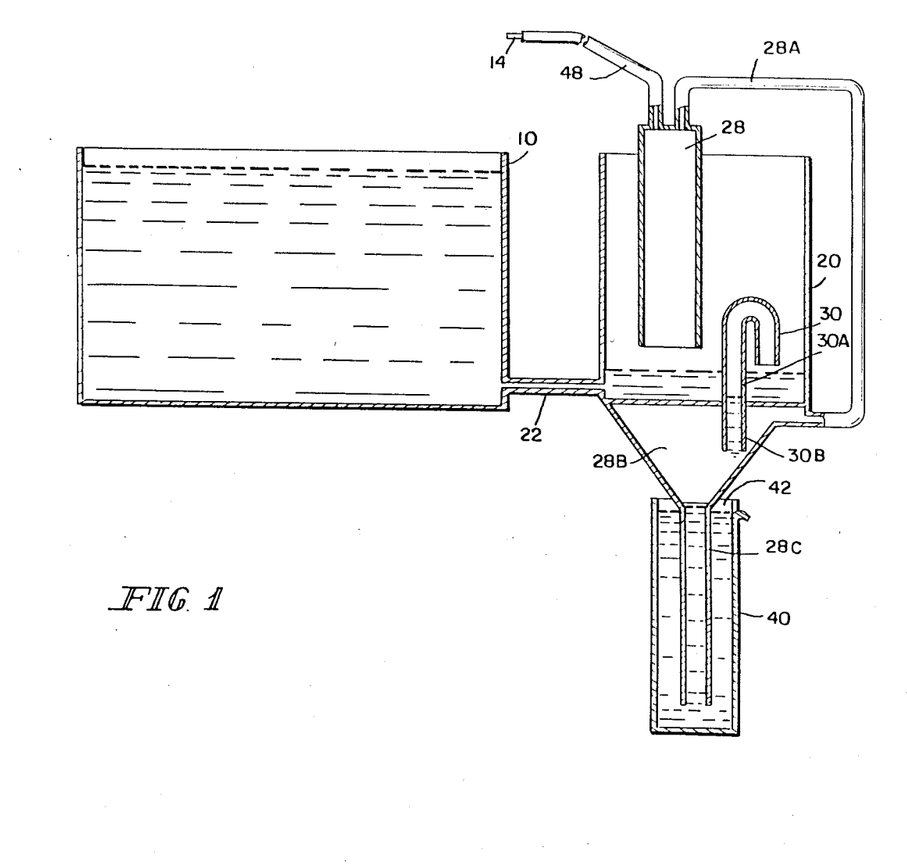
FIG. 1 shows a diagrammatic side cross-sectional view of the apparatus with liquid levels immediately after outflow.
Figure 2:
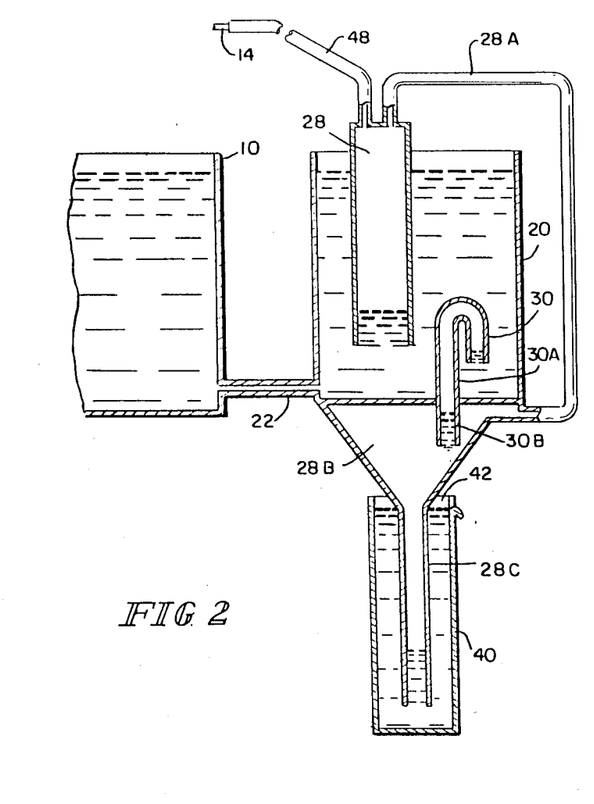
FIG. 2 shows the same apparatus with liquid levels a few seconds later, when the container has refilled.
Figure 3:
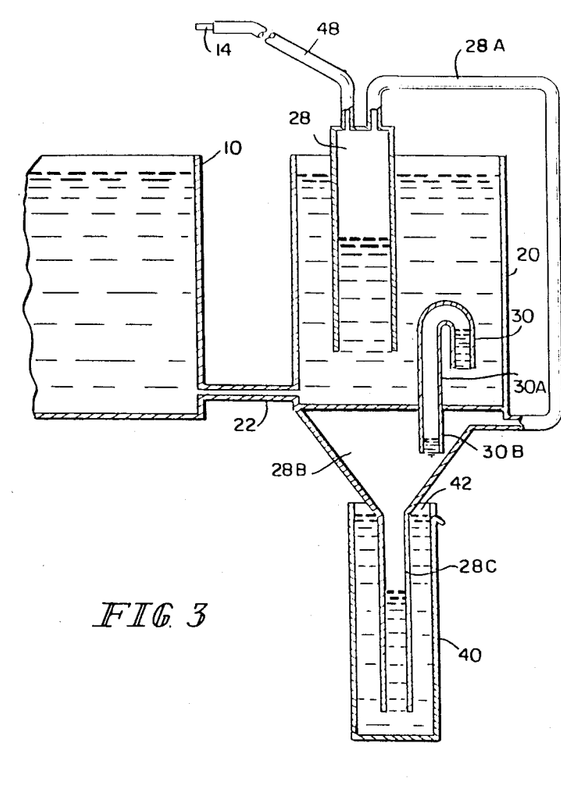
FIG. 3 shows the same apparatus with liquid levels immediately prior to outflow.

FIGS. 1, 2, and 3 show in diagrammatic form three sequential operating stages of an embodiment which tolerates fluctuations in source level within the container, minimizes the amount of air which must escape to trigger outflow, and allows maximum liquid-holding capacity in minimum space. A constant source of liquid 10 is connected through an inflow restricting conduit 22 to a liquid container 20 which is open to the atomosphere. An upper passage, comprising inflow space 30, center space 30A, and outflow space 30B, connects container 20 with a middle passage 28B and a lower passage 28C, which lower passage is immersed in liquid-retaining space 40, which has an overflow 42 for egress of liquid. An air pressure-retaining space 28, in fixed relation to container 20 and inflow space 30, is connected by air conduit 28A to middle passage 28B and lower passage 28C, and by air conduit 48 to detector 14.

Air pressure-retaining space 28 must hold enough more air than lower passage 28C so that, when container 20 is filled, liquid need rise only a moderate distance into space 28 to force air through conduit 28A and depress the liquid in lower passage 28C as far as necessary to counterbalance the liquid in container 20. Otherwise, liquid might rise high enough in space 28 to trigger outflow before air escapes through detector 14. This will be explained more fully under "operation".

Inflow space 30 of upper passages 30, 30A, and 30B should preferably have sufficient capacity to prevent liquid from reaching the top and entering center space 30A before the liquid in outflow space 30B is expelled.

FIG. 1 shows the liquid levels immediately after outflow, and FIG. 2 shows the levels a few seconds later when container 20 has refilled with liquid to the level of reservoir 10. The counterbalancing liquid, which is retained in the passage after outflow, is divided into two separate portions. A primary portion of the liquid, which always fills liquid-retaining space 40, entraps air in lower passage 28C to retain the air pressure which prevents outflow of liquid from container 20 as subsequently explained. A secondary portion of liquid is held by capillary attraction in outflow space 30B of the upper passage.

Liquid, rising in container 20, compresses air in air pressure-retaining space 28, middle passage 28B, and lower passage 28C, forcing down the liquid in passage 28C. Increasing air pressure in space 28B acts on the secondary portion of liquid in space 30B in a direction opposite to and in a magnitude approximately equal to the increasing pressure exerted against the air entrapped in spaces 30 and 30A of the upper passage by the liquid rising in container 20.

FIG. 2 shows that the secondary portion of liquid, being in a neutral position, with equal pressure on its inflow and outflow ends, is unaffected by the rising height of liquid in container 20, since changes in liquid height in that container are automatically compensated for by changes in air pressure generated in space 28 as the container level rises or falls.

The secondary portion of liquid in space 30B is balanced between two upwardly acting forces, capillary attraction in space 30B and air pressure in space 28B; and two downwardly acting forces, gravity on the liquid in container 20 and gravity on the secondary portion of liquid in space 30B.

Thus balanced, the secondary portion of liquid in space 30B can only be acted upon by the flow-triggering column of liquid which rises in space 28 when air escapes through detector 14. As this column of liquid rises in space 28, its weight counteracts the pressure created by the liquid in container 20, reducing the upward pressure against the air above, and thereby also reducing the air pressure in space 28B. Decreasing the upward force of the air pressure in space 28B destroys the balance holding the secondary portion of liquid in space 30B, allowing it to be expelled, and thereby triggering outflow from container 20.

Once outflow from container 20 has stopped, liquid from reservoir 10, constantly flowing through flow-restricting conduit 22 into container 20, rises and enters a slight distance into inflow space 30 of the upper passage until stopped by the air entrapped in center space 30A by the liquid held by capillary attraction in outflow space 30B. Liquid continues to rise in container 20 as fast as flow-restricting conduit 22 allows, next entering the bottom of air pressure-retaining space 28, forcing the air above through air conduit 28A against the air entrapped in middle passage 28B, which forces liquid in lower passage 28C down toward the bottom as liquid fills container 20 to the level of reservoir 10.

Liquid need rise only a moderate distance into air pressure-retaining space 28 to compress enough air to force the liquid in lower passage 28C down far enough below the surface of the liquid in liquid-retaining space 40 to counterbalance the height of the liquid in container 20, since space 28 holds much more air than lower passage 28C. The air pressure in middle passage 28B, generated by the greater height of the liquid in container 20 above the height of the liquid in space 28, presses upward against the liquid in space 30B of the upper passage, forcing the air entrapped in space 30A against the liquid in space 30 to prevent outflow from container 20. Sufficient back pressure to prevent outflow is maintained automatically by the air in passages 28B and 28C.

FIG. 2 illustrates the condition of static equilibrium which continues as long as adequate moisture exists in the zone of liquid use. At such time as the zone of liquid use dries to a predetermined moisture level, air will then escape from space 28 through air conduit 48 and detector 14. When moisture is called for in the zone of liquid use and the flow-triggering column of liquid rises in space 28 by forcing air through detector 14, the air pressure above the column decreases because the height or pressure of this column must be subtracted from the height or pressure of the liquid in container 20 which is the source of the pressure. Thus, as the height of the column in space 28 approaches the height of the liquid in container 20, the effective air pressure in space 28 approaches zero.

FIG. 3 shows the liquid levels immediately prior to outflow as liquid rises in spaces 28 and 30 and is forced lower in space 30B. Liquid in lower passage 28C rises as the air pressure above it decreases. Pressure on inflow space 30 of the upper passage remains unchanged and equal to the height of the liquid in container 20 but, since air pressure against the liquid entrapped in outflow space 30B is decreasing, liquid rises in inflow space 30, compressing air in center space 30A against the liquid in outflow space 30B, forcing it to the bottom and then out of that space.

Liquid from container 20 then flows without opposition through the upper passages 30, 30A, and 30B into middle passage 28B and lower passage 28C. When the liquid level rises in lower passage 28C and then into middle passage 28B, it provides pressure causing the liquid to flow rapidly through lower passage 28C into liquid-retaining space 40 to exit at overflow 42 until the liquid level in container 20 has dropped below the inflow space 30 of the upper passage, the point at which the operation started. Container 20 again starts to refill and flow cycles continue as long as air can escape through detector 14.

Inflow space 30 of the upper passage is preferably positioned lower than the entrance to air pressure-retaining space 28 in order to force the liquid level in container 20 to drop below that entrance and ensure that liquid drains out of space 28 before outflow stops.

At the instant outflow is completed, the liquid level in container 20 drops below the inflow space 30 of the upper passage because the cohesion of liquid molecules flowing from container 20 into space 30 prevents the entry of air into space 30 until enough liquid is drawn out to bring the surface of the liquid in container 20 considerably below the entrance to space 30. Molecular cohesion enables the final quantity of liquid drawn out actually to flow uphill. The time during which the liquid in container 20 remains below the entrance to inflow space 30 permits air to enter space 30 and liquid to flow out of the upper passage and middle passage 28B.

Outflow is facilitated if the entrance to lower passage 28C is large enough to enable liquid to flow into the passage without immediately covering the entrance and entrapping all the air below. For this reason, the upper passage preferably does not flow directly into the center of passages 28B and 28C, but down their sides, which minimizes air entrapment.

Air conduits 28A and 48 must be located a sufficient distance above the maximum liquid level in space 28 so that liquid cannot enter them. Liquid does not normally enter the lower end of air conduit 28A. Passages in which liquid must be retained above air are preferably small, usually under three mm in diameter, to provide a cohesive liquid column through which air cannot rise.

To clarify the description, the elements in the diagrams are widely separated. Air conduit 28A, for example, is pictured as external to the other elements, whereas all elements could be compactly inserted into a tube-shaped device with a maximum diameter slightly over 13 mm.

Upper passage 30, 30A, 30B may have shapes other than the one shown in the diagrams. The top of a straight tube comprising spaces 30A and 30B may extend up inside an inverted cup which performs the same air-entrapping function as inflow space 30. As a workable configuration where the liquid supply level can be maintained with practically no variation, a straight, vertical tube without an inverted cup may also be used, especially if the lower end, corresponding to outflow space 30B, is made smaller in diameter than the upper end corresponding to spaces 30 and 30A. Then, after outflow from the container, the liquid in the larger diameter upper end will flow down easily under gravity so most of the liquid retained by capillary attraction will remain in the lower outflow space. When the container refills above the open upper end of the tube, liquid will only descend a slight distance into the tube before being stopped by air entrapped above the liquid held firmly in the small, lower outflow space by capillary attraction. Liquid can continue to rise for a considerable distance above the open upper end of the tube before driving out the capillary liquid and the entrapped air.

In a distinguishing feature of the embodiment illustrated in FIGS. 1, 2, and 3, which serves to make maximum space available for liquid storage, flow is triggered by decreasing pressure on the outflow space 30B of the upper passage while pressure on the inflow space 30 remains unchanged. It follows that pressure on the inflow space is increased relative to the outflow space, and this applies not only to the subject embodiment but also to embodiments in parent application U.S. Ser. No. 015,775. Work can be done wherever a pressure differential exists, whether the pressure is positive or negative. A vertical tube filled with liquid can produce pressure at the bottom and vacuum at the top, and a device that would perform the function of the subject invention with pressures reversed could probably be produced, but the basic principle would remain the same.

Liquid always assumes the shape of its container and an almost infinite variety of structures can perform the required function. The method whereby the function is performed is considered more basic to the invention than any structures shown or discussed. FIGS. 1, 2, and 3 which illustrate the operation of the embodiment, therefore, are purposely diagrammatic in form in order to emphasize method rather than structure.

Figure 4:
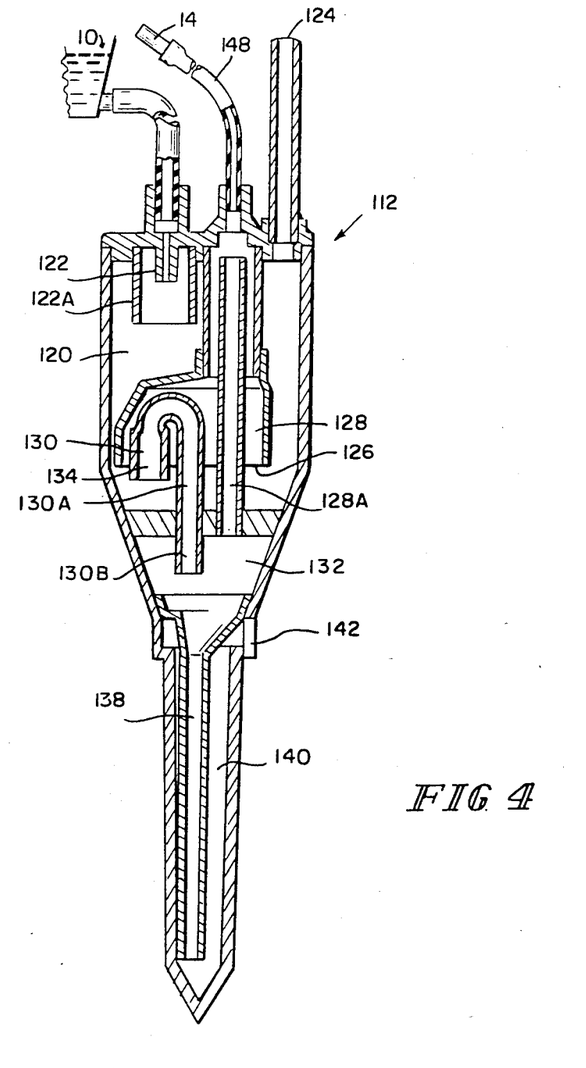
FIG. 4 shows a side cross-sectional view of an exemplary embodiment of the invention.

A practical embodiment 112 of the invention is shown in FIG. 4. A source of liquid 10 is connected through a restricted passage 122 to container 120 which is open to the atmosphere by way of opening 124. A shield 112A within container 120 surrounds restricted passage 122 to exclude liquid and make inflow visable.

An air pressure-retaining space 128 having lower edge 126 is provided within container 120. The air pressure-retaining space 128 is connected by air conduit 148 to detector 14. The air pressure-retaining space 128 is also connected to a middle passage 132 by air conduit 128A.

A liquid conduit 134 comprising inflow space 130, center space 130A, and outflow space 130B connects container 120 with middle passage 132 and lower passage 138. The lower passage 138 is immersed in liquid-retaining space 140 which has at its upper end opening 142 for the egress of the metered liquid passing through the device 112.

The volume of the air-retaining space 128 is greater than the volume of the lower passage 138. The junction of air conduits 128A and 148 is sufficiently high that liquid from container 120 will not, in the ordinary course, enter into either conduit. Rather, the rise of liquid in air-retaining space 128 will cause downward depression of liquid in lower passage 138 below opening 142 which will cause a flow-retaining pressure to develop which is exerted through conduit 134.

With the release of the retained air in space 128 through detector 14, flow of liquid from container 120 through conduit 134 to space 132 is initiated. The liquid flowing through conduit 134 continues downward through lower passage 138 and then upward through liquid-retaining space 140 to emerge from device 112 through opening 142. The diameters of conduit 134, lower passage 138, and opening 142 are sufficient to allow the emergence of liquid through opening 142 faster than any inflow of liquid through restricted opening 122, thereby ensuring a lowering a liquid level in container 120.

As the level of the liquid in chamber 120 falls further to a point below the lower end of inflow space 130 of conduit 134, the flow of liquid through conduit 134 terminates and all but outflow space 130B of conduit 134 is emptied of liquid and filled with air. The flow of liquid through lower passage 138, retaining space 140, and out overflow opening 142 also terminates with the liquid-retaining space 140 retaining a residual amount of liquid. A direct comparison between the apparatus 112 and the more schematic presentations of FIGS. 1-3 is apparent.

Figure 5:
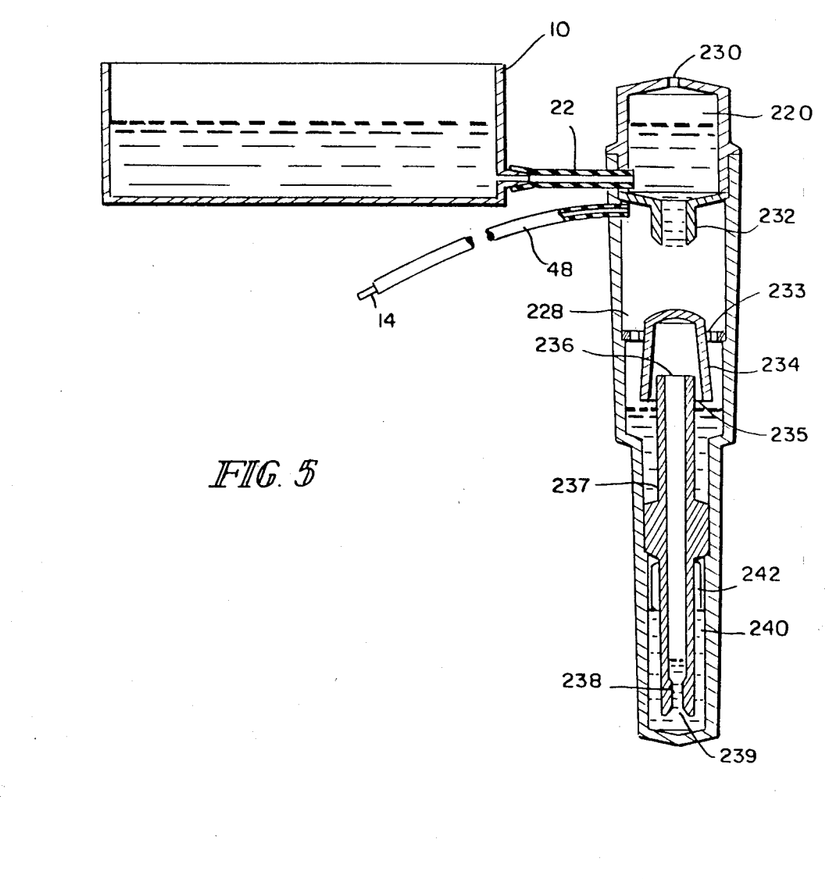

FIG. 5 shows another practical embodiment of the invention in which a single portion of counterbalancing liquid opposes outflow of liquid from container 220 and also opposes the pressure of the flow-triggering column of liquid which rises in the air pressure-retaining space 228 when air escapes through the air conduit 48 and the detector 14 until the flow-triggering column rises high enough to trigger outflow. Container 220 is open to the atmosphere through air vent 230 and receives liquid from constant level reservoir 10 through conduit 22 which is restricted in size so that liquid can flow out of container 220 faster than it can flow in.

Liquid in container 220 will not enter air pressure-retaining space 228 through discharge outlet 232 until air can escape through detector 14 in response to a lack of adequate moisture in a zone of liquid use. Outlet 232 should have an internal diameter small enough to retain liquid in a cohesive column to prevent the liquid in container 220 from entering space 228 down one side of the outlet 232 while air from that space escapes up the other side. Outlet 232 should preferably also have a large enough internal diameter not to restrain significantly by capillary attraction the final portion of liquid leaving container 220. An internal diameter for the outlet not greatly over 3 mm is satisfactory.

Inflow cup 234 surrounds the upper end of tube 237 and entraps air in a manner similar to inflow space 30 of FIGS. 1, 2, and 3. Cup 234 is held in space 228 by four radial spokes 233 which do not obstruct liquid flow. The top 236 of tube 237 is positioned higher than entrance 235 to inflow cup 234 so liquid cannot enter top 236 before it rises in inflow cup 234. Two forces combine to provide the counterbalancing pressure in tube 237. The first force is generated by the height of the liquid in liquid-retaining space 240 above the outlet of tube 237. The second force is generated by capillary attraction in the capillary section 238 of tube 237, and is added to the first force to provide the total counterbalancing pressure. The fact that liquid in the capillary section 238 of tube 237 is in direct contact with the liquid in space 240 does not nullify the capillary attraction. When a tube is immersed in liquid, the liquid rises in the tube because the attraction of the tube for the liquid is greater than the attraction of the liquid for itself. The internal diameter of capillary section 238 can be in the 1 to 2 mm range and the balance of tube 237 somewhat larger, although tubes having a single or a larger internal diameter will operate satisfactorily. The spherical hollow 239 at the outlet of capillary section 238 retains outflowing air in contact with that outlet to prevent liquid from reentering capillary section 238 after each air bubble emerges, which could reestablish capillary attraction and prevent the rapid outflow of air from tube 237.

FIG. 5 illustrates the condition of static equilibrium which exists prior to the escape of any air through detector 14. Container 220 is filled to the level of reservoir 10, and air pressure has forced liquid in tube 237 far enough below the liquid level in space 240 to counterbalance the container liquid. The liquid level in air pressure-retaining space 228 is below entrance 235 to inflow cup 234 because, during the previous outflow, that liquid level had dropped still lower before flow through inflow cup 234 was cut off. A small amount of liquid from container 220 then entered space 228 to force down the liquid in tube 237 far enough to counterbalance the liquid in container 220, but this liquid was not enough to raise the liquid level in space 228 up to entrance 235 to inflow cup 234.

When air starts to escape through detector 14, the liquid level in space 228 rises above entrance 235 to inflow cup 234, entrapping air in inflow cup 234 and forcing liquid lower in tube 237. As the flow-triggering column of liquid continues to rise in air-retaining space 228, the air pressure increases in inflow cup 234 and tube 237. Liquid is forced to the bottom of capillary section 238 by the increasing air pressure and, once all liquid is expelled, the force of capillary attraction is removed, producing a sudden, sharp drop in the counterbalancing pressure. Liquid from space 228 then flows unopposed into inflow cup 234 up to a point 1 or 2 mm above the top 236 of the tube 237, then down tube 237 into space 240, and out overflow 242 to the zone of liquid use. Container 220 empties, permitting air to enter space 228 through outlet 232 along with the small amount of liquid allowed through restricted conduit 22. The cohesion of liquid molecules permits the level of the outflowing liquid in space 228 to drop a substantial distance below entrance 235 to inflow cup 234 before outflow is cut off so air can enter inflow cup 234 and the top 236 of tube 237.

While the present invention has been described in detail with reference to both schematic and more practical embodiments, other variations will be apparent to those skilled in the art, which variations are intended to be included in the invention as defined by the following claims.

I claim:

1. A method for automatically delivering a metered amount of a liquid from a source of the liquid to a zone of liquid use having a moisture content through a passage terminating in a dispensing outlet, the method comprising the steps of (a) filling a lower portion of the passage with the liquid, (b) providing a moisture detector in the zone of liquid use, the detector retaining air in a space above the liquid in the lower portion of the passage when the moisture content in the zone of liquid use exceeds a selected threshhold level, (c) filling an upper portion of the passage with liquid from the source, the liquid in the upper portion being prevented from flowing to the lower portion by the pressure exerted by the retained air, (d) releasing the retained air through the moisture detector when the moisture content in the zone of liquid use is less than the selected threshold level, thereby allowing the liquid in the upper portion to flow to the lower portion, liquid consequently being delivered to the zone of liquid use through the dispensing outlet, and (e) refilling the upper portion of the passage more slowly than liquid flows from the upper portion to the lower portion, thereby allowing the space above the liquid in the lower portion to be replenished with air.

2. The method of claim 1, further comprising the step of
retaining liquid in the lower portion of the passage, the retained liquid pressurizing the retained air in the space above the retained liquid.

3. The method of claim 1, further comprising the steps of
sensing a condition in the zone of liquid use requiring the delivery of liquid, and
releasing said retained air in response to sensing said condition.

4. The method of claim 3, further comprising the step of
replacing the released, previously retained air with liquid to build up a flow-triggering column of liquid above said lower portion of the passage, which column triggers the flow of liquid through the passage to the zone of liquid use.

5. The method of claim 2 wherein the retained liquid comprises two portions,
a primary portion of retained liquid entrapping air under a back pressure sufficient to prevent outflow of liquid from said upper portion of the passage, and
a secondary portion of retained liquid entrapping air to counterbalance a flow-triggering column of liquid which rises to force out and replace said entrapped air,
the rise of the flow-triggering column of liquid continuing until it exerts more pressure than can be counterbalanced by the secondary portion of entrapped liquid, whereupon the secondary portion of liquid is the overpowered by said flow-triggering column and flow is started whereby liquid flows through said passage to said zone of liquid use.

6. The method of claim 5 wherein said flow-triggering column of liquid, which as it rises to replace said entrapped air, triggers liquid flow by increasing pressure on an inflow side of said secondary portion of liquid relative to the pressure on an outflow side of said secondary portion of liquid.

7. The method of claim 5 wherein said flow-triggering column of liquid, which as it rises to replace said entrapped air, triggers liquid flow by decreasing the pressure on an outflow side of said secondary portion of liquid, the pressure on a corresponding inflow side of the secondary portion of liquid remaining substantially constant.

8. The method of claim 1, further comprising the step of
retaining the liquid in a container open to the atmosphere, the container forming an upper portion of the passage, the liquid being retained therein by air entrapped in the passage between the liquid in the container and the liquid present in said lower portion of the passage, the air being maintained at a pressure sufficient to counterbalance the weight of liquid in the container.

9. The method of claim 8, further comprising the steps of
allowing the level of outflowing liquid surrounding the entrance to an outflow passage to drop below the entrance to the outflow passage while liquid, flowing uphill due to the cohesion of the molecules of the liquid, continues to enter the outflow passage, and
cutting off the flow of liquid into the outflow passage only when the level of the liquid drops far enough below the entrance to the outflow passage so that the cohesion of the molecules of the liquid is no longer sufficiently strong to maintain the uphill flow of liquid.

10. The method of claim 9, further comprising the step of:
drawing air into said outflow passage to replace the final portion of liquid moving lower in said passage, thereby separating that portion of liquid from the inflowing liquid which rises to the entrance to the outflow passage.

11. The method of claim 1, further comprising the step of positioning the moisture detector at a location sufficiently remote from the dispensing outlet as to preclude delivery of liquid from the source to the detector during a single cycle of steps (a) through (e).

12. A method for automatically delivering a metered amount of a liquid from a source of the liquid to a zone of liquid use through a passage terminating in a dispensing outlet, the method comprising the steps of
filling a lower portion of the passage with a liquid,
retaining air in a space above the liquid in the lower portion of the passage,
filling an upper portion of the passage with liquid from the source, the liquid in the upper portion being prevented from flowing to the lower portion in part by the pressure exerted by the retained air,
releasing the retained air and building up a flow-triggering liquid head in said space to cause the liquid in the upper portion to flow to the lower portion, liquid consequently being delivered to the zone of liquid use through the dispensing outlet, and
refilling the upper portion of the passage more slowly than liquid flows from the upper portion to the lower portion, thereby allowing the space above the liquid in the lower portion to be replenished with air.

* * * * *

UNITED STATES PATENT AND TRADEMARK OFFICE
CERTIFICATE OF CORRECTION

PATENT NO. : 4,542,762
DATED : September 24, 1985
INVENTOR(S) : Bradner M. Littlehale It is certified that error appears in the above-identified patent and that said Letters Patent is hereby corrected as shown below:

In column 4, line 37, replace "problem" with --problems--.

In column 8, line 54, replace "112A" with --122A--.

In column 9, line 20, after "lowering" replace "a" with --of--.

In column 11, line 56, replace "the" with --then--.

Signed and Sealed this

Eighth Day of April 1986

[SEAL]

Attest:

DONALD J. QUIGG

Attesting Officer

Commissioner of Patents and Trademarks